Feb. 11, 1930.  W. GUETHLER  1,746,892
DOUGH MIXER
Filed June 16, 1928  2 Sheets-Sheet 1

INVENTOR
William Guethler
By W. W. Williamson
Atty.

Feb. 11, 1930. W. GUETHLER 1,746,892
DOUGH MIXER
Filed June 16, 1928 2 Sheets-Sheet 2
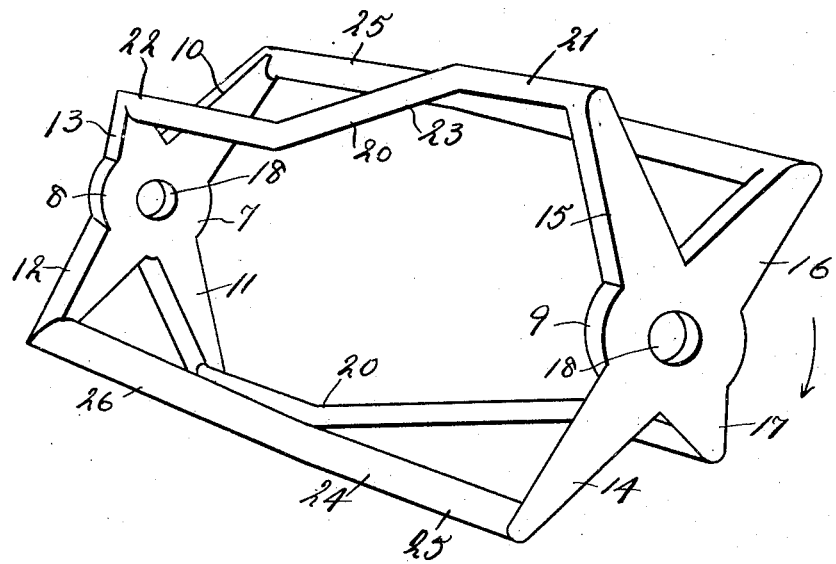
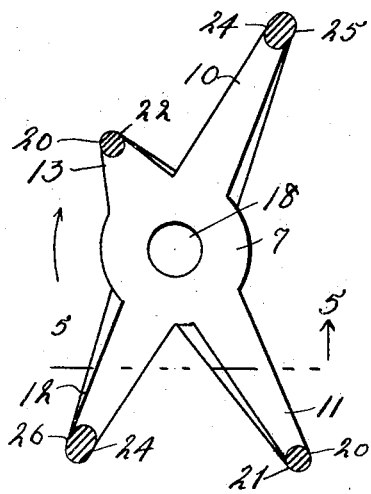
INVENTOR
William Guethler
By H. W. Williamson
Atty.

Patented Feb. 11, 1930

1,746,892

UNITED STATES PATENT OFFICE

WILLIAM GUETHLER, OF PHILADELPHIA, PENNSYLVANIA

DOUGH MIXER

Application filed June 16, 1928. Serial No. 285,944.

My invention relates to new and useful improvements in dough mixers and has for one of its objects to improve the construction of the mixer or agitator illustrated in Patent No. 1,666,698, dated April 17, 1928.

Another object of my invention is to produce a dough mixer including an agitator having uniquely shaped bars to produce a certain amount of reciprocating motion to the dough lengthwise of the bowl of the machine and to lift sections of the dough from the bulk thereof and again drop it into the bulk so that a certain amount of pulling and kneading actions are produced which tend to modify the gluten or flour to such an extent that it becomes more elastic and absorption of the yeast gases takes place at a higher rate of speed.

A further object of the invention is to so arrange several parts or sections of the different bars that they will lift portions of the dough from the bulk thereof and later drop it back into the bulk and simultaneous with the lifting and dropping actions, portions of the dough will be shifted back and forth lengthwise of the device until finally all of the dough has been thoroughly kneaded, resulting in a composition of light texture.

A still further object of the invention is the construction of an agitator including two spiders carrying a pair of bars, each having two portions, one portion at each end, parallel with the axis of the agitator but different distances therefrom and an intermediate portion oblique to the axis of the agitator but in the same plane therewith and another pair of bars, each having one end parallel with the axis of the agitator and the opposite end oblique to said axis but in the same plane therewith.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by numerals to the accompanying drawings forming a part of this application, in which:—

Fig. 3, is a perspective view of the agitator.

Fig. 4, is a section on the line 4—4 of Fig. 1.

Fig. 5, is a section on the line 5—5 of Fig. 4.

Figures 1, 2:
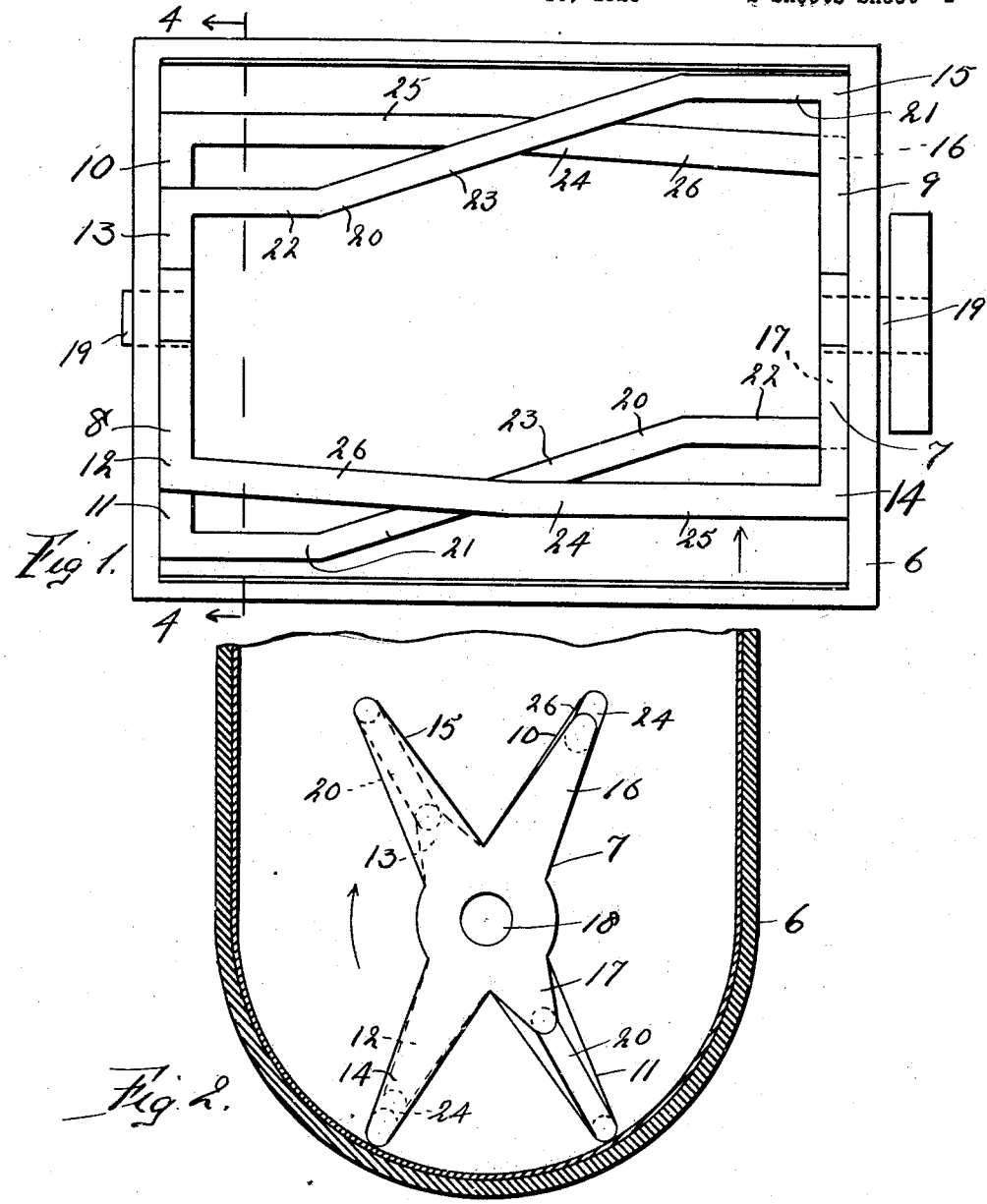
Fig. 1, is a plan view of a dough mixer constructed in accordance with my invention.
Fig. 2, is a vertical section of the bowl showing an end elevation of the agitator.

In carrying out my invention as herein embodied, 6 represents the bowl which may be of any well known or ordinary construction and either stationary or tiltable as is usual with this class of devices.

Suitably journalled within the bowl so as to rotate is an agitator 7 including two spiders 8 and 9. The spider 8 includes a pair of adjacent long radial arms 10 and 11, an intermediate arm 12 and a short arm 13, likewise the spider 9 includes two long arms 14 and 15, an intermediate arm 16 and a short arm 17 and as will be obvious by reference to Fig. 3, similar arms of the spiders are located on diagrammatically opposite sides of the axis of the agitator.

The spiders are provided with hub openings 18 for the reception of trunnions or axles 19 which are rotatably mounted in the ends of the bowl for journalling the agitator.

Connected with the shortest arm of one spider and one of the longest arms of the other spider which is in alignment with said short arm is a bar 20, preferably oval in cross section having a portion 21 parallel with the axis of the agitator and which is adapted to scrape or pass in close proximity to the inner surface of the lower part of the bowl, another portion 22 also parallel in close proximity to the axis of the agitator and an intermediate portion 23 oblique to but having its axis in the same plane as the axis of the agitator.

As will be obvious the portions 21 of the bars 20 travel in the arc of a circle of approximately the same diameter as the curved portion of the bowl while the part or section 22 of each of these bars travels in the arc of a circle smaller in diameter than the curved portion of the bowl and the parts 21 and 22 of one of these bars are in reverse positions relative to the same portions of the other bar so that opposite ends of the bowl are alternately scraped by the parts 21 of said bars 20. The intermediate oblique parts 23 of said bars alternately shift the ingredients, material or dough being mixed from one end to the other of the bowl.

Connected to the intermediate arm of one of the spiders and the other of the longest arms of the other spider is a bar 24 which may be of any cross sectional shape although preferably round and this bar includes a part or section 25 parallel with the axis of the agitator and adapted to scrape or travel in close proximity to the inner surface of the bowl and another part or section 26 oblique to, but having its axis in the same plane as, the axis of the agitator and the parts or sections 25 and 26 of one bar are in reverse positions relative to the same parts or sections of the other bar so that opposite ends of the bowl will be alternately scraped by the parts or section 25 of said bars.

The parts 25 of the bars 24 will drag the under portions of the dough bulk to one side and upward, finally lifting said portion into an elevated position where it will drop back into the dough bulk or on to others of the bars and during this time other portions of the underneath dough will be dragged out by the parts or sections 26 of said bars 24 and shifted lengthwise of the bowl.

As a bar 24 passes through the dough bulk it will be followed by a bar 20 and the part or section 21 thereof will also drag the underneath portion of the dough bulk to one side and upward until lifted above the axis of the agitator at which time that portion of the dough will fall or be thrown back on to the top of the dough bulk and at the same time the intermediate portion of the dough bulk will be stirred up by the part or section 21 of the same bar and also during this action some portions of the dough will be shifted lengthwise of the bowl by the part or section 23.

Because of the unique shapes of the bars and their arrangements relative to each other, the dough will be thoroughly agitated and mixed and every particle of the dough will be acted upon to cause proper kneading and permit quick fermentation.

It might be well to state at this time that the direction of rotation of the agitator is such that the bars 24 travel between 55 and 75 degrees in advance of the bars 20.

Of course I do not wish to be limited to the exact details of construction as herein shown as these may be varied within the limits of the appended claims without departing from the spirit of my invention.

Having thus fully described my invention, what I claim as new and useful is:—

1. In a dough mixer, the combination of a bowl and an agitator rotatably mounted in said bowl and comprising a pair of spiders, two bars connected to said spiders on opposite sides of the agitator axis, said bars each having a section parallel with the axis of the agitator and traveling in close proximity to the inner surface of the bowl for stretching and lifting dough and also having a section oblique in the same plane as the axis of the agitator, the oblique sections of said bars being located adjacent opposite the spiders, and another pair of bars opposite the sides of the axis of the agitator and between first mentioned bars, said last named bars each having an intermediate section oblique to and in the same plane as the axis of the agitator and having a section at one end of the oblique section parallel to the axis of the agitator and traveling in proximity to the inner surface of the bowl for stretching and lifting the dough and also having another section parallel to the axis of the agitator at the opposite end of the oblique section and traveling in the arc of a circuit adjacent said axis of the agitator for stirring the dough, the similar end sections of the last mentioned bars being located adjacent opposite spiders.

2. A dough mixer including an agitator comprising bars at opposite sides thereof, each having an oblique portion at one end for imparting alternate reciprocating movements to the mixable materials, and other bars independent of the first mentioned ones, having oblique portions intermediate the ends for imparting other alternate reciprocating movements to the mixable materials.

3. A dough mixer including an agitator comprising bars at opposite sides thereof, each of said bars having an oblique portion at one end and a straight portion at the opposite end, one of said bars being reversed end for end of the other similar bar, the oblique portions imparting alternate reciprocating movements to a batch of dough and the straight portions stretching and lifting said dough and other bars having intermediate oblique portions for imparting other alternate reciprocating movements to said dough.

4. A dough mixer including an agitator comprising four bars arranged in pairs, one pair of said bars having straight portions at one end and oblique portions at the other end and the other pair of bars having oblique portions intermediate their ends, all of said bars coacting to progressively impart movements to a batch of dough back and forth along the agitator.

In testimony whereof, I have hereunto affixed my signature.

WILLIAM GUETHLER.